(12) United States Patent
Wend et al.

(10) Patent No.: US 9,187,252 B2
(45) Date of Patent: Nov. 17, 2015

(54) TRANSPORT BAG FOR TRANSPORTING GOODS IN A HANGING MANNER

(71) Applicant: Dürkopp Fördertechnik GmbH, Bielefeld (DE)

(72) Inventors: Michael Wend, Bielefeld (DE); Paul Janzen, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 0 days.

(21) Appl. No.: 14/221,622

(22) Filed: Mar. 21, 2014

(65) Prior Publication Data
US 2014/0284180 A1  Sep. 25, 2014

(30) Foreign Application Priority Data

Mar. 22, 2013 (DE) .......................... 10 2013 205 172

(51) Int. Cl.
*B65G 17/20* (2006.01)
*B65G 17/12* (2006.01)
(Continued)

(52) U.S. Cl.
CPC ............... *B65G 17/12* (2013.01); *B65G 9/002* (2013.01); *B65G 19/025* (2013.01); *B65G 47/61* (2013.01); *B65G 9/004* (2013.01)

(58) Field of Classification Search
CPC ................................ B65G 47/61; B07C 3/082
USPC .............. 198/384, 397.01, 678.1, 687.1, 715; 53/249, 250, 564, 570
See application file for complete search history.

(56) References Cited

U.S. PATENT DOCUMENTS 4,730,721 A * 3/1988 Demaiter et al. ............. 198/715
5,115,626 A * 5/1992 Rutter et al. ..................... 53/468
(Continued)

FOREIGN PATENT DOCUMENTS

DE            697856 C      10/1940
DE     102011101987 A1    11/2012
(Continued)

OTHER PUBLICATIONS

European Search report dated Sep. 9, 2014 in connection with corresponding EP application No. 14161028.7.

*Primary Examiner* — Douglas Hess
(74) *Attorney, Agent, or Firm* — Browdy and Neimark, PLLC (57) ABSTRACT

A transport bag is used for transporting goods, in other words products, in a hanging manner. The transport bag has a rigid carrying wall which, when in the transport position, has an upper portion that is connected to a carrying element for carrying the transport bag in a hanging manner. A flexible product retaining wall forms, together with the carrying wall, a carrying bag which is closed downwards and towards two opposite sides at least in the transport position of the transport bag. The carrying wall is connected to the retaining wall between a wall connecting portion which faces upwards in the transport position and a wall connecting portion which faces downwards in the transport position in such a way that a length of the web-shaped retaining wall is variably adjustable to the transport of different products, wherein the length of the web-shaped retaining wall is removable from a retaining wall reservoir and a non-required portion of the retaining wall remains in the retaining wall reservoir. The transport bag is provided such that this length adjustment of the retaining wall is performed by a relative displacement relative to the carrying wall at least in the region of one of the two connecting portions. As a result, a transport bag is obtained which prevents the goods from being damaged during transport.

11 Claims, 8 Drawing Sheets

(51) Int. Cl.
  *B65G 19/02* (2006.01)
  *B65G 47/61* (2006.01)
  *B65G 9/00* (2006.01)

(56) References Cited

U.S. PATENT DOCUMENTS

| | | | |
|---|---|---|---|
| 5,232,078 A * | 8/1993 | Kuhlmann et al. | 198/360 |
| 5,337,541 A * | 8/1994 | Gmuer | 53/459 |
| 5,428,938 A * | 7/1995 | Davis | 53/284.7 |
| 6,003,289 A * | 12/1999 | McGregor et al. | 53/570 |
| 6,148,588 A * | 11/2000 | Thomas et al. | 53/412 |
| 6,164,440 A * | 12/2000 | Van Bree | 198/867.11 |
| 6,712,196 B2 * | 3/2004 | Ikemoto et al. | 198/468.2 |
| 7,637,081 B2 * | 12/2009 | Murakami et al. | 53/384.1 |
| 7,877,966 B2 * | 2/2011 | Knoke et al. | 53/469 |
| 8,490,774 B2 * | 7/2013 | Janzen | 198/397.01 |
| 8,607,963 B2 * | 12/2013 | Wend et al. | 198/430 |
| 8,672,118 B2 * | 3/2014 | Janzen et al. | 198/678.1 |
| 8,720,667 B2 * | 5/2014 | Koga | 198/432 |

FOREIGN PATENT DOCUMENTS

| | | |
|---|---|---|
| EP | 1420105 A1 | 5/2004 |
| EP | 2130968 A1 | 12/2009 |
| EP | 2196415 A2 | 6/2010 |

* cited by examiner

TRANSPORT BAG FOR TRANSPORTING GOODS IN A HANGING MANNER

CROSS-REFERENCES TO RELATED APPLICATIONS

This application claims the priority of Patent Application Serial No. DE 10 2013 205 172.7 filed on Mar. 22, 2013, pursuant to 35 U.S.C. 119(a)-(d), the content of which is incorporated herein by reference in its entirety as if fully set forth herein.

FIELD OF THE INVENTION

The invention relates to a transport bag for transporting goods, in other words products, in a hanging manner. The invention further relates to a loading station for transport bags of this type and a conveyor system comprising a loading station of this type.

BACKGROUND OF THE INVENTION

Such a transport bag is known from EP 2 130 968 A1.

SUMMARY OF THE INVENTION

An object of the invention is to further develop a transport bag in such a way as to prevent the goods from being damaged during transport.

This object is achieved according to the invention by a transport bag for transporting products in a hanging manner, comprising a rigid carrying wall a portion of which facing upwards when in the transport position is connected to a carrying element for carrying the transport bag in a hanging manner, comprising a flexible product retaining wall which, together with the carrying wall, forms a carrying bag that is closed downwards and towards two opposite sides at least in the transport position of the transport bag, wherein the carrying wall is connected to the retaining wall between a wall connecting portion facing upwards when in the transport position and a wall connecting portion facing downwards when in the transport position in such a way that a length of the web-shaped retaining wall is variably adjustable to the transport of different products, wherein the length of the web-shaped retaining wall required for the transport of the products is removable from a retaining wall reservoir and a non-required portion of the retaining wall remains in the retaining wall reservoir, wherein the transport bag is provided such that this length adjustment of the retaining wall is performed by a relative displacement of the retaining wall relative to the carrying wall at least in the region of one of the two connecting portions.

The flexible carrying wall, which is length-adjustable according to the invention, allows a bag shape to be precisely adapted to the product to be transported without requiring an elasticity of the carrying wall. A transport bag of this type allows for example pieces of clothing to be transported in a hanging manner without the risk of wrinkling. It is not necessary for the pieces of clothing to be connected with the carrying member directly, for example by means of a hanger. Other goods such as packaged goods or books as well as other types of bulk material can be securely transported as well. The carrying member of the transport bag may be a hook or any other carrying coupling which is connectable to a carrying component. The carrying wall may be provided with an anti-slip coating for securing the goods. The transport bag may be configured for manual and/or automated loading.

The sides of the carrying wall may in each case be provided with a protruding boundary wall so as to prevent the goods from sliding over the sides of the carrying wall. The flexible and length-adjustable retaining wall is provided with a retaining wall reservoir. The retaining wall reservoir comprises a non-required portion of the retaining wall. The non-required portion of the retaining wall is maximal if the bag is unloaded, in other words if no goods are transported in the transport bag. The non-required portion is also present if a product is transported the size of which is such that not the entire size of the carrying wall is required. The transport bag is configured such that only the portion of the retaining wall is removed from the retaining wall reservoir that is required for carrying and/or securing a product depending on the size thereof. The non-required portion remains in the retaining wall reservoir. A length of the web-shaped retaining wall between the upper and the lower wall connecting portions is variably adjustable to the transport of different goods. In particular when smaller goods are transported, only the length of the web-shaped retaining wall is removed from the retaining wall reservoir that is required for transporting the goods. The goods are clamped in the transport bag, in particular between the retaining wall and the carrying wall, and thus secured. The goods are in a stable position in the transport bag. The goods are transported in the bag in a stable manner. Therefore, the goods are arranged in the transport bag in a defined and secured manner. An unwanted and uncontrolled displacement of the goods in the transport bag is precluded. The transport bag according to the invention ensures a reliable and safe transport. The retaining wall reservoir may for instance be configured as a protruding portion or a supply roll.

Removing the retaining wall from the retaining wall reservoir is in particular reversible. This means that when the goods have been transported, the non-required length of the retaining wall may be moved back into the retaining wall reservoir. This ensures that a comparatively small product may be reliably transported after a comparatively larger product has been transported using the transport bag.

A convex shape between the two wall connecting portions of the carrying wall towards the retaining wall ensures that the flexible retaining wall clamps the goods against the retaining wall irrespective of a thickness of the goods. The convex shape of the carrying wall may be achieved by a convex curvature. The carrying wall may have a constant radius of curvature between the two wall connecting portions or different radii of curvature in different portions between the wall connecting portions. A radius of curvature of the carrying wall may be in the range of between 1 m and 3 m. The radius of curvature need not be constant between the two wall connecting portions but may increase for example towards the lower wall connecting portion or towards the upper wall connecting portion. Also, the radius of curvature may have its maximum or its minimum in the middle between the two wall connecting portions. As an alternative to a convex curvature, a convex shape of the carrying wall can also be achieved by joining together a plurality of plane carrying wall portions so as to form the carrying wall in the manner of a polygon. The carrying wall may be formed by for instance five to twenty carrying wall portions which are joined together in the manner of a polygon. As a result, a convex polygonal design of the carrying wall is obtained.

A non-elastic retaining wall may be made of a rigid material so as to ensure a long-lasting transport bag.

A supply roll for winding up portions of the retaining wall allows a compact transport bag to be formed.

A spring shaft of the supply roll facilitates winding up of the retaining wall and may be used for securing the goods by clamping them between the retaining wall and the carrying wall.

A bracket connection which is pivotable about a joint connected to the carrying wall, wherein the supply roll is connected to the end of the bracket which is opposite to the joint, is a guidance system for the supply roll that is easy to manufacture. The bracket joint may be arranged in the middle between the wall connecting portions. It is conceivable for two brackets comprising corresponding bracket joints to be arranged symmetrically on both sides of the web-shaped retaining wall.

A coupling for detachably connecting the retaining wall to the carrying wall in the upper wall connecting portion and/or in the lower wall connecting portion provides an operationally safe way of opening and closing the transport bag.

A design in which the coupling is provided with a ratchet which is displaceable, by means of an actuation member, in a direction opposite to a preloading force between a locked position and a release position is particularly suitable for an automated opening or closing of the transport bag.

A design of the coupling such that a coupling member of the coupling is rigidly connected to the supply roll provides for easier manufacture. A loading station for transport bags according to the invention, the loading station comprising at least one conveyor run for conveying the transport bags and comprising the following station sections: an inlet section along which the unloaded transport bags are supplied, wherein the transport bags are hanging relative to a section of the conveyor run; a loading section along which the transport bags are conveyed horizontally to another section of the conveyor run; a discharge section along which the loaded transport bags are discharged, wherein the transport bags are hanging relative to another section of the conveyor run provides for easy loading of the transport bags while being transported through the loading station. The loading section may be configured as a loading table which is accessible either for an automated supply of goods or to an operator for manual loading.

The advantages of a conveyor system comprising at least one loading station according to the invention, and at least one unloading station for unloading the products from the transport bags correspond to those which have already been explained above with reference to the loading station and the transport bag. The conveyor system may be provided with a conveyor drive.

Exemplary embodiments of the invention will be explained below with reference to the drawings.

DESCRIPTION OF THE PREFERRED EMBODIMENTS

A first embodiment of a transport bag 1 for transporting goods in a hanging manner is described with reference to FIGS. 1 to 3. The goods may be pieces of clothing but also other and in particular rigid goods such as books or packages and in particular also small-sized goods.

Figure 3:
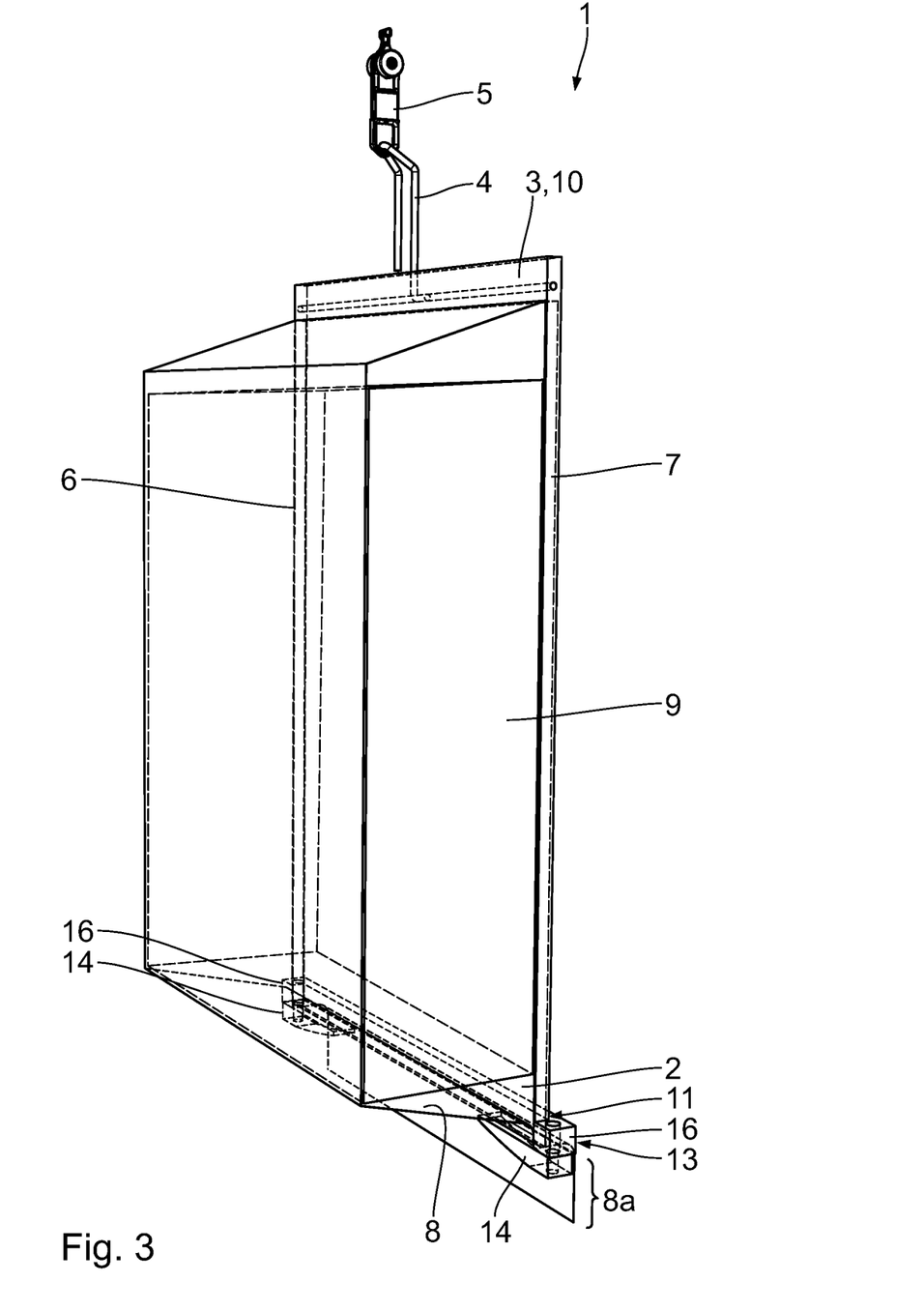
FIG. 3 shows a view of the transport bag that is similar to FIG. 2, wherein in order to transport a box-shaped product, the retaining wall is extended along its web-shaped portion so as to bulge outwards.

The transport bag 1 has a rigid carrying wall 2 (cf. FIG. 3). When in the transport position, the upper portion 3 of the rigid carrying wall 2 is connected to a carrying element 4 for carrying the transport bag 1 in a hanging manner. In the embodiment according to FIG. 1, the carrying element 4 is a carrying bracket which engages into a roll adapter 5 known from prior art, thus allowing the transport bag 1 to be guided along a guide rail system of a conveyor system also known from prior art.

In the transport position, the two lateral edge regions of the carrying wall 2 have two protruding boundary wall portions 6, 7.

The transport bag 1 further has a flexible, web-shaped product retaining wall 8. Together with the carrying wall 2, the product retaining wall 8 forms a bag which is closed downwards and towards two opposite sides when the transport bag 1 is in the transport position. The two other sides of the bag may be open as shown in the example according to FIG. 3 in which the transport bag 1 carries a package 9. In the shown transport position, the transport bag 1 is closed towards the two opposite sides, namely towards the carrying wall 2 on the one hand and towards the product retaining wall 8 on the other, and is open towards the two other sides. By means of the protruding boundary wall portions 6, 7, the package 9 is secured against sliding over the sides of the boundary wall portions 6, 7.

The flexible product retaining wall 8 is made of a non-elastic material such as a PE material having a PVC coating.

In the transport position, the carrying wall 2 is connected to the retaining wall 8 between an upper wall connecting portion 10 and a lower wall connecting portion 11 in such a way that a length of the web-shaped retaining wall 8 is adjustable in a web direction between the two wall connecting portions 10, 11 so as to allow the transport of different goods.

Figure 1:
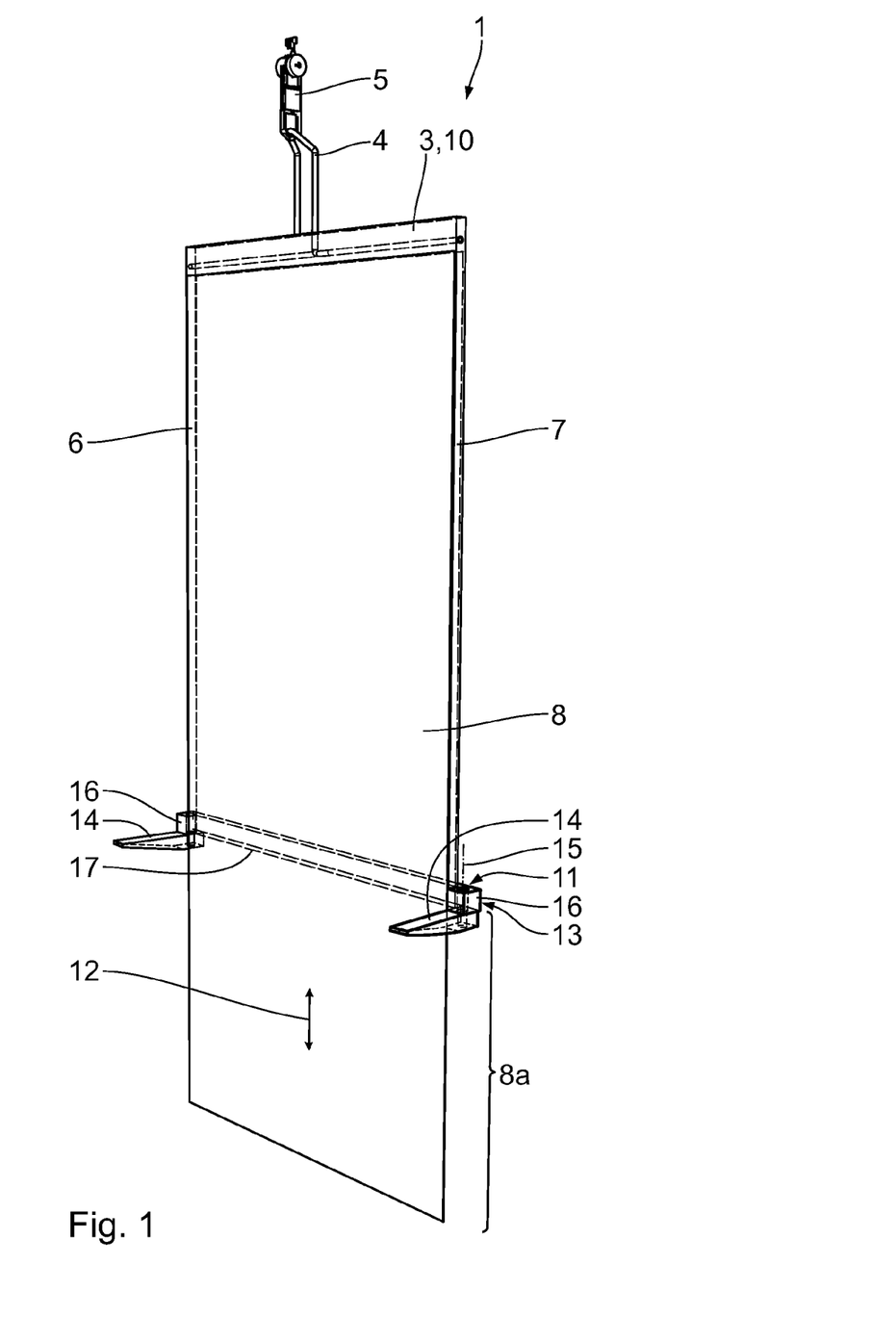
FIG. 1 shows a perspective view of a first embodiment of a transport bag for transporting goods in a hanging manner, wherein a coupling for detachably connecting a carrying wall of the transport bag to a web-shaped product retaining wall of the transport bag is shown in a release position.
Figure 2:
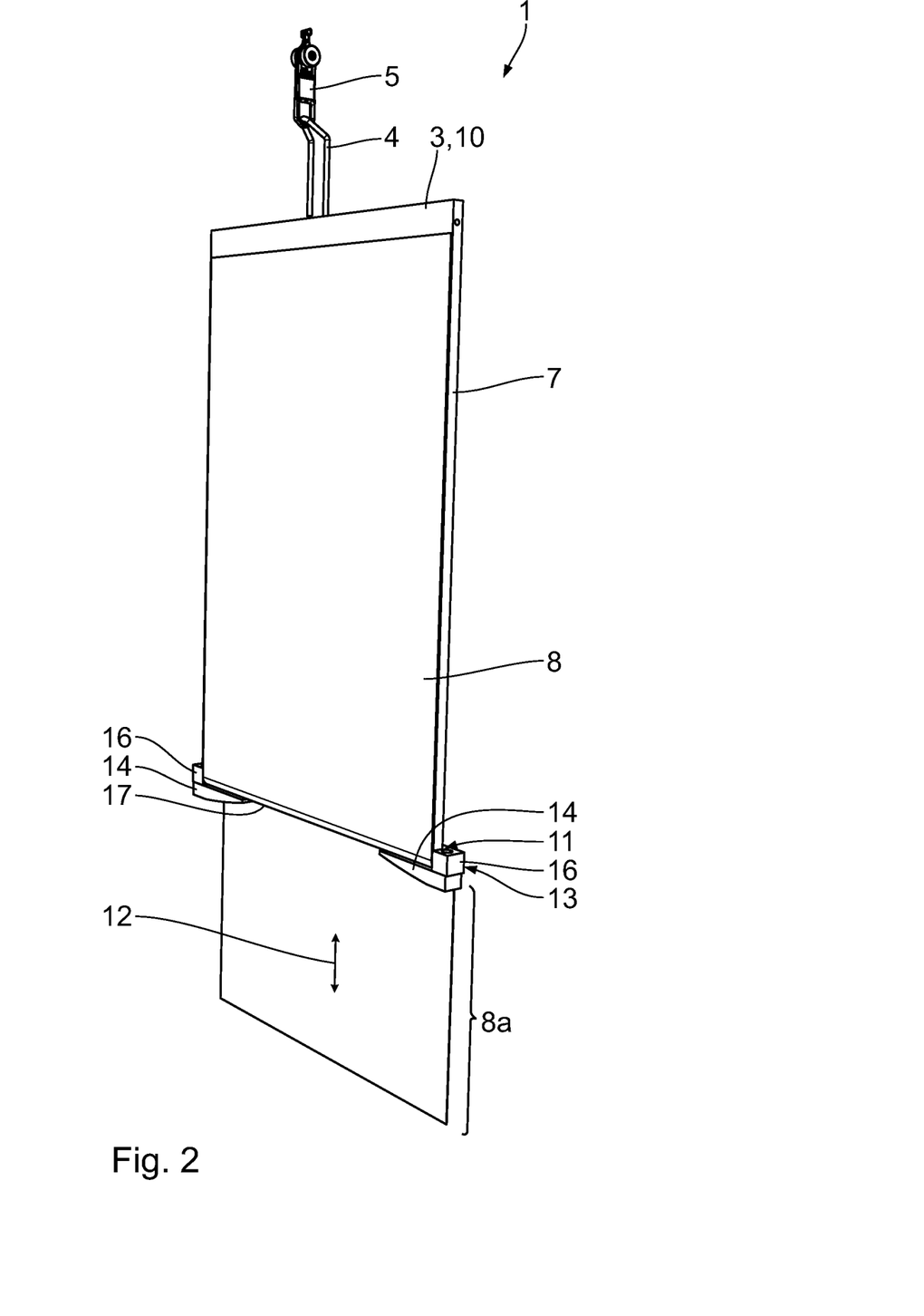
FIG. 2 shows the transport bag according to FIG. 1, wherein the coupling is shown in a locked position in which the retaining wall is rigidly connected to the carrying wall in the coupling region.

FIGS. 1 and 2 show an initial position of the retaining wall 8 relative to the carrying wall 2 in which the entire retaining wall 8 is in a surface-to-surface contact with the carrying wall 2. In this initial position, a web portion 8a of the flexible product retaining wall 8 protrudes beyond the lower web connecting portion 11.

FIGS. 3 shows a position of the retaining wall 8 in which the length of retaining wall 8 is adjusted between the two wall connecting portions 10, 11 for transporting the package 9. The protrusion 8a of the retaining wall 8 has reduced correspondingly.

The retaining wall 8 is length-adjusted by a relative displacement of the retaining wall 8 along the web direction 12 relative to the carrying wall 2 in the region of the lower connecting portion 11.

A coupling 13 is provided for detachably connecting the retaining wall 8 to the carrying wall 2 in the lower wall connecting portion 11 and in particular for locking the retaining wall 8 in the lower wall connecting portion 11 in the length-adjusted position. The coupling 13 is arranged in the region of the lower wall connecting portion 11. FIG. 1 shows the coupling 13 in a release position in which the retaining wall 8 is displaceable relative to the carrying wall 2 in the web direction 12, while FIG. 2 shows the coupling 13 in a locked position in which the retaining wall 8 is locked in position relative to the carrying wall 2 so that a displacement in the web direction 12 is prevented and in which the bag is at the same time closed at the lower wall connecting portion 11.

The coupling 13 has two clamping levers 14 each of which is rotatable about an outside swivel axis 15 which is vertical when the transport bag 1 is in the transport position. The swivel movement of the clamping levers 14 is in each case guided by a swivel bearing part 16 of the coupling 13 which is mounted to the outside of the boundary wall portions 6, 7 of the carrying wall 2. In the release position according to FIG. 1, the two clamping levers 14 are displaced to such an extent that they are out of engagement with the flexible product retaining wall 8. In the locked position according to FIG. 2, each of the two clamping levers 14 is swivelled inwards through 90° about the associated swivel axis 15 so that a portion of the retaining wall 8 is clamped against a lower frame 17 of the carrying wall 2 in the lower wall connecting portion 11. The two clamping levers are adapted for manual displacement between the release position according to FIG. 1 and the locked position according to FIG. 2.

When the bag is loaded, the product is arranged between the two bag walls 2, 8. The flexible product retaining wall 8 is displaced in the web direction 12 relative to the carrying wall 2 until there is enough space in the bag thus formed to receive the product, for instance the package 9. The flexible product retaining wall 8 is then pulled tightly in the web direction 12 until the product is secured in the bag and secured relative to the carrying wall 2 by displacing the two clamping levers 14 from the release into the locked position. The bag is then loaded and ready for transport of the product secured therein. In order to discharge the product, the two clamping levers 14 are released, allowing the product retaining wall to be loosened by pulling it in the web direction 12. The product may then be removed from the bag.

Figure 4:
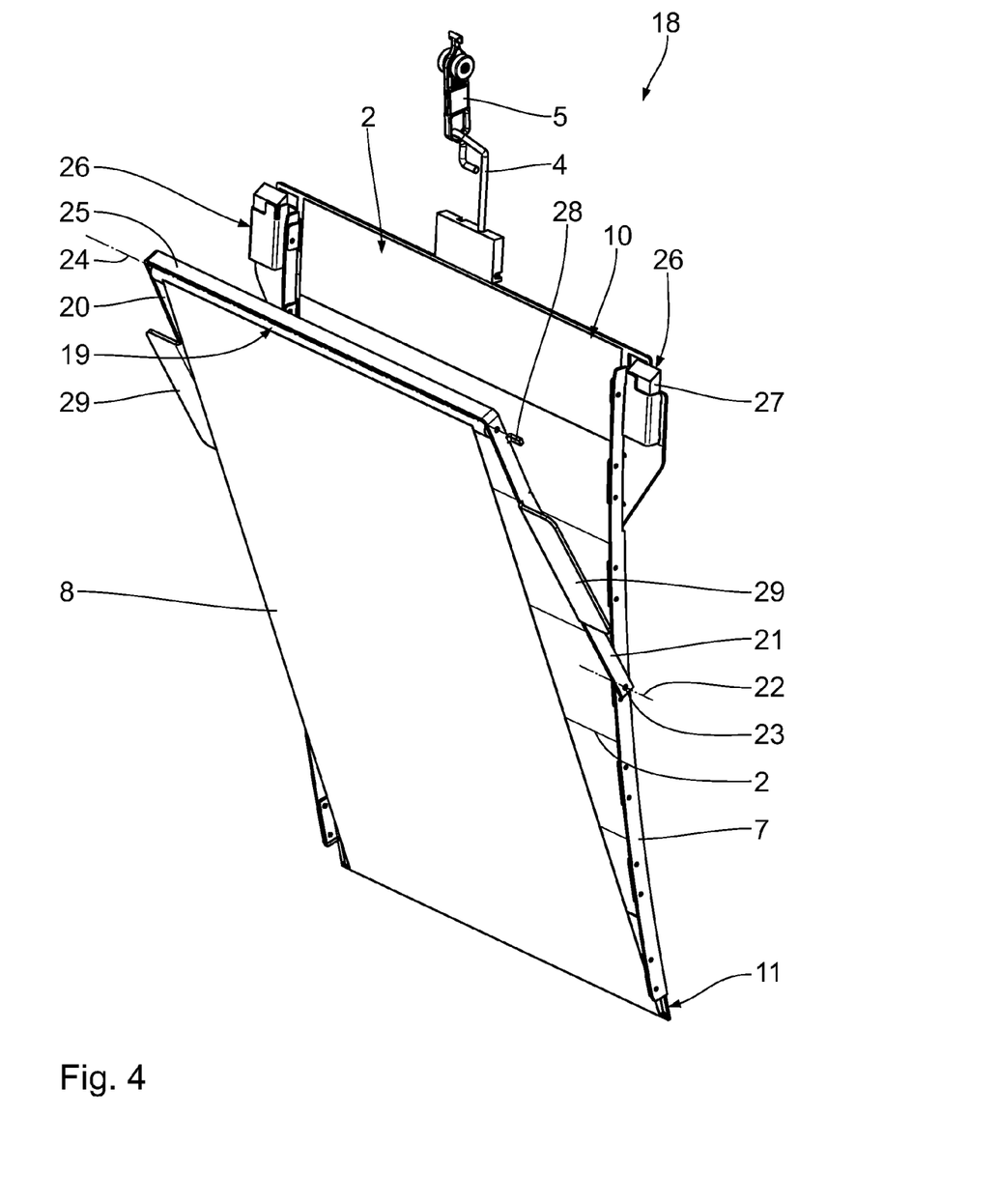
FIG. 4 shows another embodiment of a transport bag for transporting goods in a hanging manner, wherein a supply roll for a flexible product retaining wall is shown in a pivoted position near a coupling end position in which the product retaining wall is connectable to a rigid carrying wall of the transport bag, wherein the coupling is arranged near an upper bag end, in other words near a carrying element for carrying the transport bag in a hanging manner.

The following is a description, with reference to FIG. 4, of another embodiment of a transport bag 18 for transporting goods in a hanging manner. Components and functions which correspond to those described above with reference to FIGS. 1 to 3 are designated by the same reference numerals and are not discussed in detail again.

The carrying wall 2 has a base body of a rigid material which may be composed of one or multiple parts. The material of the base body may be a plastic or a metal. The carrying wall 2 is provided with an anti-slip coating for goods to be arranged thereon. Said coating may include PU and/or rubber.

The transport bag 18 is configured such that the carrying wall 2 is convex-curved towards the bag, in other words towards the flexible product retaining wall 8. A radius of curvature of the carrying wall 2 is in the range of between 1 m and 3 m. As an alternative to the convex-curved shape of the carrying wall 2, a convex shape of the carrying wall 2 may also be achieved by means of a plurality of plane carrying wall portions which are joined together between the upper wall connecting portion 10 and the lower wall connecting portion 11 so as to form the carrying wall 2, wherein two adjacent carrying wall portions in each case form a small angle between each other so that a section through the carrying wall in a direction perpendicular to the extension of the two connecting portions 10, 11 is in the shape of polygon. The carrying wall 2 may be formed of for instance five to twenty polygon carrying wall portions.

The flexible product retaining wall 8 of the transport bag 18 is configured such that portions thereof are wound up on a supply roll 19. Depending on the position of the supply roll 19, the supply roll 19 carries either the entire product retaining wall or only the portion of the product retaining wall which, in the embodiment according to FIGS. 1 to 3, is arranged in the region of the protrusion 8a.

The supply roll 19 is configured as a spring shaft which keeps the non-wound up retaining wall 8 under tension between the supply roll 19 and the lower wall connecting portion 11. The retaining wall 8 is automatically and variably adjustable to the size of different products. This ensures that the flexible retaining wall 8 automatically and variably adjusts itself to different product sizes. There is in particular no need for a manual intervention for example by an operator to variably secure the retaining wall 8 if the transport bag 18 is used for the transport of different product sizes. The transport bag 18 has two pivotable brackets 20, 21. The brackets 20, 21 are in each case pivotable about a pivot joint 23 about a pivot axis 22 which extends horizontally in the plane of the carrying wall 2 when the transport bag 18 is in the transport position. The pivot axis 22 is arranged in the middle between the upper wall connecting portion 10 and the lower wall connecting portion 11. The pivot joints 23 for the brackets 20, 21 are mounted to the lateral boundary wall portions 6, 7 of the carrying wall 2.

The two pivot joints 23 are therefore arranged on both sides of the web-shaped retaining wall 8.

The ends of the brackets 20, 21, which are in each case opposite to the pivot joint 23, are connected to the supply roll 19 in such a way that the supply roll 19 is accommodated between the ends of the brackets 20, 21 so as to be rotatable about a roll axis 24 which is horizontal as well and extends parallel to the pivot axis 22. A frame 25 is arranged between the brackets 20, 21 for stabilisation, the frame 25 being adjacent to the supply roll 19.

Instead of the coupling 13, the transport bag 18 is provided with another embodiment of a coupling 26 for detachably connecting the retaining wall 8 to the carrying wall 2, in this case in the upper wall connecting portion 10. The coupling 26 includes a coupling part in the form of a ratchet 27 which is secured to the frame of the carrying wall 2 in the region of the upper wall connecting portion 10. The coupling 26 has in each case a counter coupling part in the form of a coupling pin 28 which is arranged on the outside of the respective bracket 20, 21 next to the roll axis 24. The coupling 26 has two pairs comprising a ratchet 27 and a coupling pin 28 which are in each case arranged on both sides of the boundary wall portions 6, 7.

The coupling pins 28 are coupling members of the coupling 26 which are rigidly connected to the supply roll 19.

When the transport bag 18 is to be loaded with a product or a plurality of products, the supply roll 19 is initially, i.e. in an open position of the transport bag 18, disposed directly next to the lower wall connecting portion 11. In this open position, the supply roll 19 is held in place by the preloading force provided by the spring shaft. In the open position, virtually the entire retaining wall 8 is wound up on the supply roll 19. For loading, the transport bag 18 is arranged in a position in which the convex upper side of the carrying wall 2 faces upwards so that the product may easily be placed on the carrying wall 2. The pivot brackets 20, 21 are now grasped by actuation handles 29 formed on the pivot brackets 20, 21 so as to move the supply roll 19 about the pivot axis 22 from the open position via the position shown in FIG. 4 into a closed position in which the coupling 26 is in the locked position. In doing so, a required amount of the flexible product retaining wall 8 is wound off the supply roll 19, with the retaining wall 8 being in contact with the product due to the preloading force provided by the spring shaft and due to the convex shape of the carrying wall 2 so as to secure the product in the bag. When the two coupling pins 28 come into engagement in the locked position, they overcome a preloading force of their associated ratchets 27. In the locked position, the protrusion 8a of the retaining wall 8 remains wound up on the supply roll 19.

When the transport bag 18 is to be unloaded, the two ratchets 27 are displaced in a direction opposite to their preloading force into their respective release position for the ratchets 28 to release the coupling pins 28. Supported by the preloading force of the spring shaft of the supply roll 19, the brackets 20, 21 move back to the open position, allowing the product to the removed from the bag.

Figure 5:
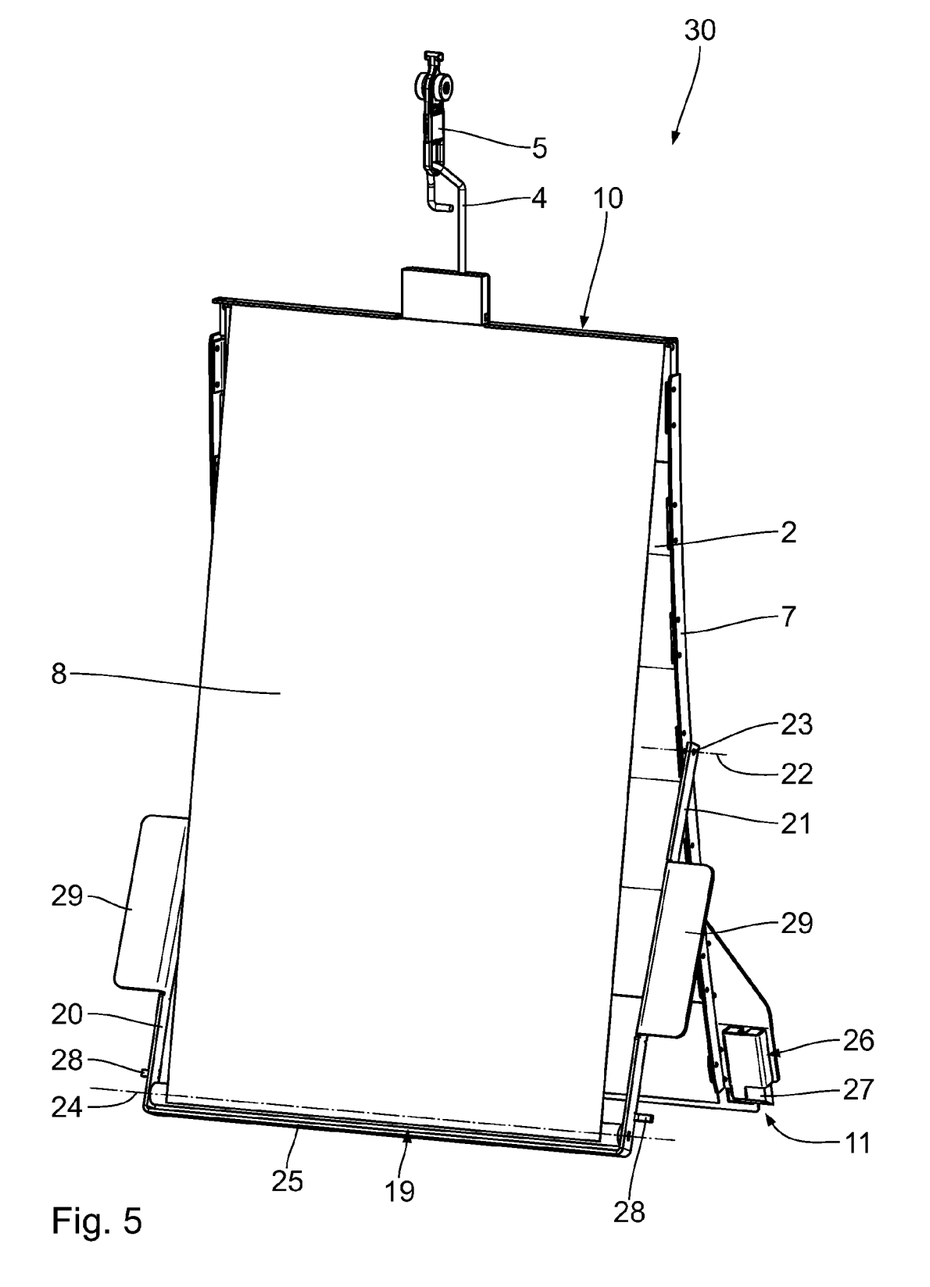
FIG. 5 shows a view, similar to FIG. 4, of another embodiment of a transport bag for transporting goods in a hanging manner, wherein in this embodiment, a coupling is arranged in the region of an end of the transport bag that is opposite to the carrying element.

The following is a description, with reference to FIG. 5, of another embodiment of a transport bag 30 which may be used instead of the transport bags 1 and 18 for transporting goods in a hanging manner. Components and functions which correspond to those described above with reference to FIGS. 1 to 3 and in particular with reference to FIG. 4 are designated by the same reference numerals and are not discussed in detail again.

In contrast to the transport bag 18, the coupling 26 of the transport bag 30 is arranged in the lower wall connecting portion 11. When the transport bag 30 is in the open position, the supply roll 19, which is held in place by the spring force of the spring shaft, is disposed in the region of the upper wall connecting portion 10. When the transport bag 30 is to be loaded, it is again arranged in such a way that the convex side of the carrying wall 2 faces upwards. As already described above with reference to the transport bag 18, the product is placed on the carrying wall, and the brackets 20, 21 are moved from the open position into the closed position, causing the coupling pins 28 to come into engagement with the ratchets 27. When the transport bag is to be unloaded, the ratchets 27 are displaced into the release position, causing the coupling 26 to release the coupling pins 28 so that the brackets 20, 21 are pivoted back about the pivot axis 22 into the open position, which movement is supported by the preloading force of the spring shaft of the supply roll 19. As soon as the coupling 26 is opened when the transport bag 30 is in the hanging transport position, the product removes itself from the transport bag 30 under the influence of gravity.

Figure 6:
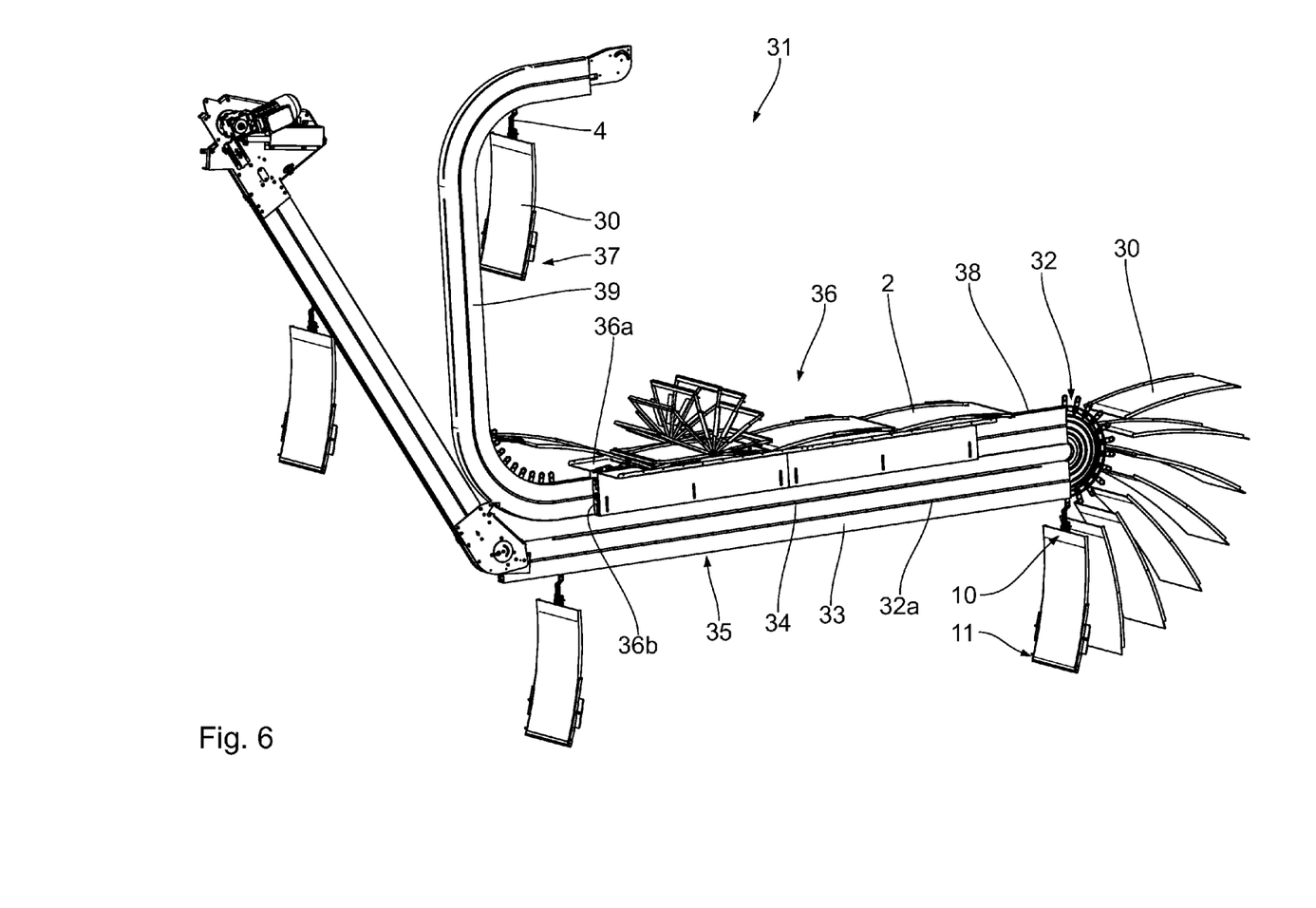
FIG. 6 shows a perspective view of a loading station for loading the transport bag with goods, shown with transport bags of the embodiment according to FIG. 5.

FIG. 6 is a perspective view of a loading station 31 for the transport bags 30. The loading station has a conveyor run 32 for conveying the transport bags 30. The conveyor run 32 defines a direction of conveyance for the transport bags 30. The conveyor run 32 comprises a conveyor rail 33 in which a driven conveyor chain 34 is guided. The conveyor run 32 of the loading station 31 conveys the transport bags 30 through a plurality of station sections, namely an inlet section 35, a loading section 36 and a discharge section 37. The unloaded transport bags 30 are supplied along the inlet section 35 in a hanging manner relative to a section 32a of the conveyor run 32. The unloaded transport bags 30 hang down vertically due to their own weight. This means that the carrying wall 2 and the retaining wall 8 are oriented transverse to the direction of conveyance. Along the inlet section 35, the direction of conveyance of the transport bags 30 is oriented horizontally. This means that the carrying wall 2 and the retaining wall 8 are in each case oriented perpendicular to the direction of conveyance. In the loading section 36, the transport bags 30 are transported horizontally to another section 38 of the conveyor run. During horizontal transport, the carrying wall 2 and the retaining wall 8 are substantially parallel to the horizontal direction of conveyance. The carrying wall 2 of the transport bag 30 lies flat on the conveyor run 32 of the loading section 36. The direction of conveyance along the loading section 36 may also be inclined relative to the horizontal. During horizontal transport of the transport bags 30, the transport bags 30 are in a spatially defined position. According to the shown embodiment, at least three points of the transport bag lie flat on the loading section 36 of the conveyor run 32, thus preventing a pivoting movement of the carrying member 4 of the transport bag 30 on the roll adapter 5. It is conceivable as well for the transport bag 30 to be locked in place during transport, for instance by locking the carrying members 4 in a desired horizontal position.

Along the discharge section 37 of the loading station 31, the loaded transport bags 30 are discharged in a hanging manner relative to another section 39 of the conveyor run.

Between the inlet section 35 and the loading section 36, the conveyor run 32 is rotated by 180°, causing the carrying members 4 of the transport bags, which—in the inlet section 35—had been arranged below the conveyor run 32, to lie flat on the conveyor run 32. In the discharge section 37, the conveyor run is again rotated by 180° so that the carrying members 4 of the transport bags 30 are again arranged below the conveyor run 32.

The loading section 36 is configured as a loading table 36a which is provided with a longitudinal groove 36b allowing the carrying members to pass through to the conveyor run 2.

When moved to the loading section 36, the transport bags 30 are open, in other words the retaining wall 8 is wound up on the respective supply roll 19. In the loading section 36, the transport bags 30 are then ready to be loaded, in other words the convex side of the carrying wall 2 faces upwards. After loading, the transport bags 30 are closed by moving the pivot brackets 20, 21 into the closed position. This may be done manually or automatically by corresponding actuation members in the loading section 36 of the loading station 31. After closing the transport bags 30 in the loading section 36, the closed transport bags 30 are discharged from the loading station 31 via the discharge section 37.

An unloading station 40 is described with reference to FIGS. 7 and 8 as another component of a conveyor system for the transport bags 30. Components and functions which correspond to those described above with reference to FIGS. 1 to 6 are designated by the same reference numerals and are not discussed in detail again.

Figure 7:
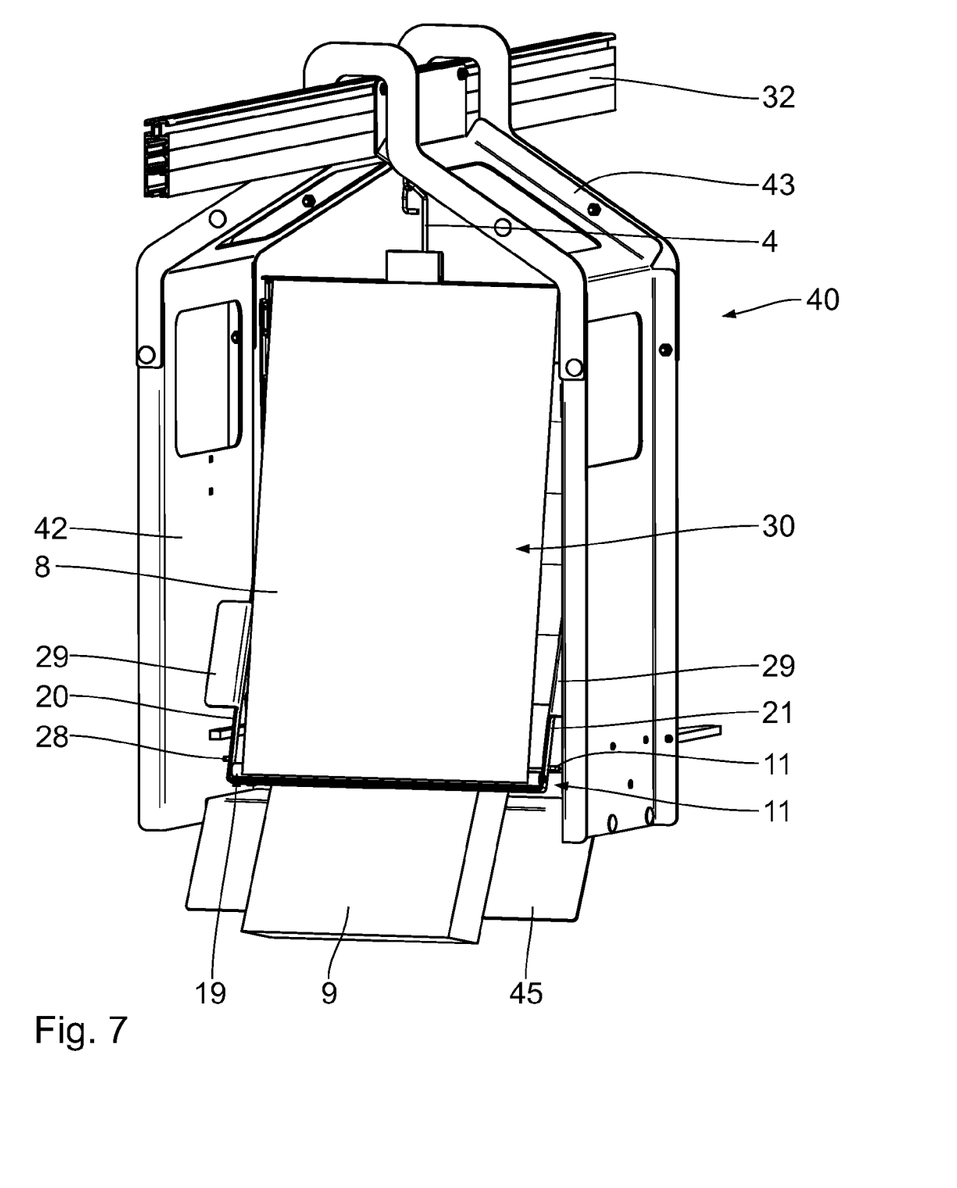
FIG. 7 shows another perspective view of a discharge station for unloading the goods from the transport bags of the embodiment according to FIG. 5.
Figure 8:
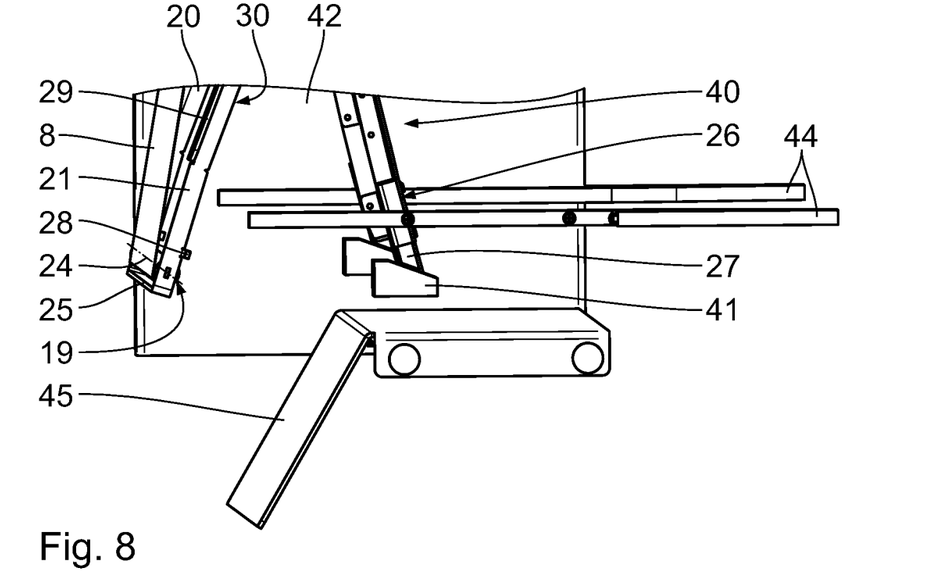
FIG. 8 shows a perspective view of a section of the discharge station, wherein one of the transport bags is shown in an instantaneous position prior to unloading.

The unloading station 40 has release means in the form of switch runners or, as shown in FIG. 8, switch wedges 41 supported by side walls 42 which are in turn mounted to the conveyor run via mounting brackets 43. The switch wedges 41 interact with the ratchets 27 for opening the couplings 26. When the transport bags 30 are conveyed through the unloading station 40, ratchets 27 run on the switch wedges 41, causing them to be displaced into the release position. As a result, the coupling pins 28 are released, causing the transport bag 30 to open for the goods (package 9) to be removed.

In order to ensure that the ratchets 27 are actuated by the switch wedges 41 in the desired manner, a movement of the respective transport bag 30 in the loading station 20 is guided, in the region of the switch wedges 41, over two guide rails 44 which are in each case arranged on the inner side walls 42 on both sides of a conveyance path of the transport bag 30 through the unloading station 40.

A guide plate 45 is provided to guide a fall direction of the product (package 9) discharged form the respective transport bag 30.

If slightly modified, the loading station 31 according to FIG. 6 and the unloading station 40 according to FIGS. 7 and 8 may also be used for the transport bags 1 and/or 18.

What is claimed is:

1. A transport bag for transporting products in a hanging manner, the transport bag comprising:
    a rigid carrying wall, a portion of which facing upwards when in the transport position is connected to a carrying element for carrying the transport bag in a hanging manner,
    a flexible product retaining wall which, together with the carrying wall, forms a carrying bag that is closed downwards and towards two opposite sides at least in the transport position of the transport bag,
    wherein the carrying wall is connected to the retaining wall between a wall connecting portion facing upwards when in the transport position and a wall connecting portion facing downwards when in the transport position in such a way that a length of the retaining wall is variably adjustable to the transport of different products,
    wherein the retaining wall is of web-shaped design,
    wherein a length of the web-shaped retaining wall required for the transport of the products is removable from a retaining wall reservoir and a non-required portion of the retaining wall remains in the retaining wall reservoir, and
    wherein the transport bag is provided such that this length adjustment of the retaining wall is performed by a relative displacement of the retaining wall relative to the carrying wall at least in the region of one of the two connecting portions.

2. A transport bag according to claim 1, wherein the carrying wall has a convex shape towards the retaining wall between the two wall connecting portions.

3. A transport bag according to claim 1, wherein the retaining wall is made of a non-elastic material.

4. A transport bag according to claim 1, wherein portions of the retaining wall are wound up on a supply roll.

5. A transport bag according to claim 4, wherein the supply roll is provided with a spring shaft.

6. A transport bag according to claim 4, comprising at least one bracket which is pivotable about a joint connected to the carrying wall, wherein the supply roll is connected to the end of the bracket which is opposite to the joint.

7. A transport bag according to claim 1, comprising a coupling for detachably connecting the retaining wall to the carrying wall in at least one of the group comprising the upper wall connecting portion and the lower wall connecting portion.

8. A transport bag according to claim 7, wherein the coupling is provided with a ratchet which is displaceable, by means of an actuation member, in a direction opposite to a preloading force between a locked position and a release position.

9. A transport bag according to claim 7, wherein a coupling member of the coupling is rigidly connected to a supply roll.

10. A loading station for transport bags,
    comprising transport bags according to claim 1 and at least one conveyor run for conveying the transport bags and comprising the following station sections:
    an inlet section along which the unloaded transport bags are supplied, wherein the transport bags are hanging relative to a section of the conveyor run;
    a loading section along which the transport bags are conveyed horizontally to another section of the conveyor run;
    a discharge section along which the loaded transport bags are discharged, wherein the transport bags are hanging relative to another section of the conveyor run.

11. A conveyor system comprising
    at least one loading station according to claim 10;
    at least one unloading station for unloading the products from the transport bags.

* * * * *